May 30, 1933.  T. H. SYMINGTON  1,911,330
ABSORPTION SHIM FOR FREIGHT CAR TRUCKS
Filed Sept. 20, 1929  2 Sheets-Sheet 1
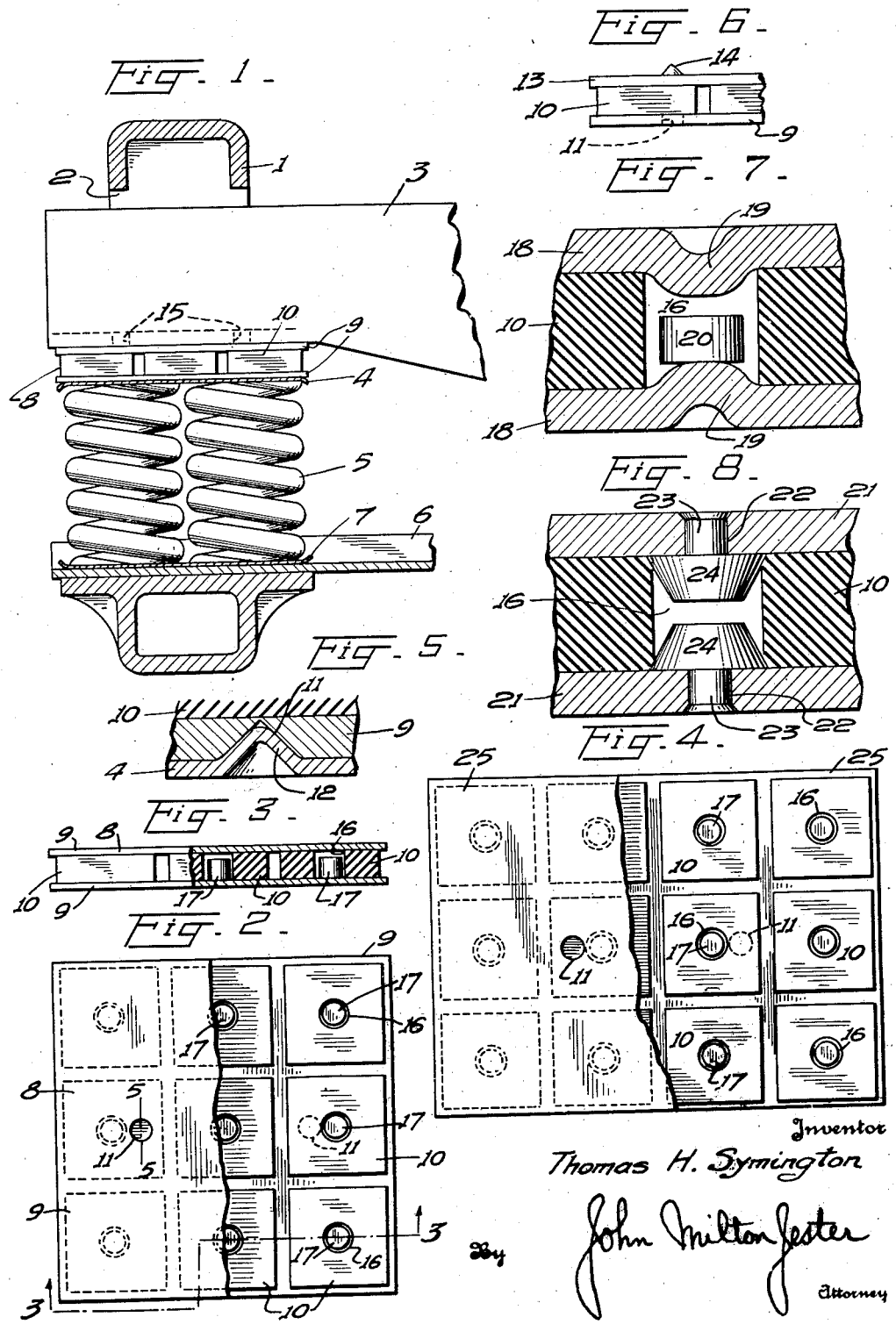

May 30, 1933.  T. H. SYMINGTON  1,911,330
ABSORPTION SHIM FOR FREIGHT CAR TRUCKS
Filed Sept. 20, 1929   2 Sheets-Sheet 2
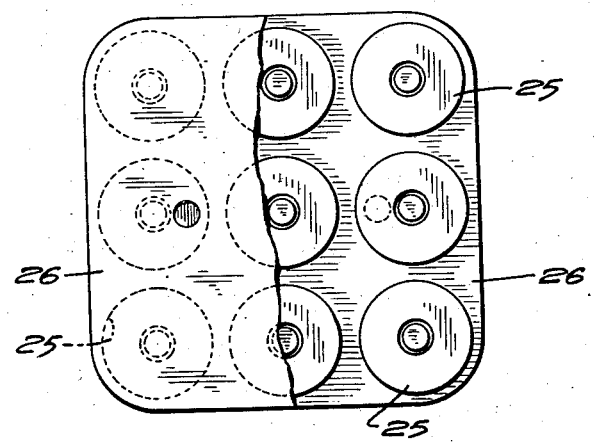
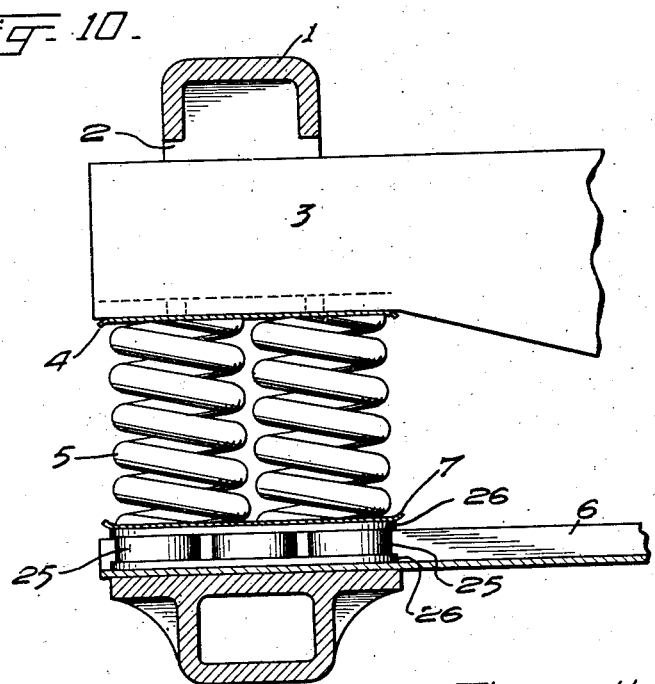
Inventor
Thomas H. Symington
By John Milton Jester
Attorney Patented May 30, 1933

1,911,330

UNITED STATES PATENT OFFICE

THOMAS H. SYMINGTON, OF BALTIMORE, MARYLAND, ASSIGNOR TO T. H. SYMINGTON & SON INC., OF BALTIMORE, MARYLAND, A CORPORATION OF MARYLAND

ABSORPTION SHIM FOR FREIGHT CAR TRUCKS

Application filed September 20, 1929. Serial No. 394,023.

The invention relates to railway equipment, particularly to accessories or attachments for use in connection with the trucks of freight cars.

It is of course well known that in the ordinary truck construction the truck bolster extends within a window opening in the side frame and is supported by a plurality of helical springs which yieldingly support the load. Springs of this, or in fact any other type, have a certain natural period of vibration. It is also known that when a freight car is travelling over a track the passage of the truck wheels over the rail joints sets up certain impulses tending to produce vibration. At certain speeds these impulses are synchronized with the natural period of vibration of the springs and the result is the development of a side sway of the car particularly as the joints in the rails are staggered. When a rocking movement of the car and truck bolster develops, there is great compression of the springs beneath the bolster end which is moving downwardly. When a sway in the other direction takes place it has been found that the recoil is so strong that the rising end of the bolster is thrown clear off from the springs. In a certain recent test of a car having a load of eighteen tons it was found that at certain different speeds, particularly at about forty-three and forty-eight miles per hour an amazing degree of vertical jiggle developed with the result that on the recoil the bolster was thrown clear of the truck springs by as much as nine-sixteenths of an inch, there being, naturally, a tremendous hammer blow exerted when the ends of the bolster move downwardly on the return. The shocks and jars resulting from this condition are very destructive to the equipment and particularly to the car lading.

It is with the above facts in view that I have devised the present invention which has for its general object the provision of an absorption means adapted to be interposed in the truck in series with the truck springs for cushioning the blow and absorbing the shocks upon the inevitable development of car jiggle under certain conditions of speed, etc.

An important object of the invention is to provide an absorption means in the nature of a compressible or yieldable shim located preferably between the truck springs and the truck bolster and operating to take a large proportion of the shock so that the equipment itself and the lading will be relieved.

A more specific object of the invention is to provide an absorption shim embodying an elastic cushion, preferably of rubber, together with the necessary metallic elements for the protection thereof, this shim being adapted for insertion between the truck bolster and the truck springs or spring cap.

Yet another object of the invention is to provide an absorption shim of this type in which the degree of compression is limited so as to avoid subjecting the yielding material to a strain greater than that it is capable of withstanding.

A still more specific object of the invention is to provide an absorption shim-like device embodying a combination of metallic and rubber elements so related that the latter will absorb or cushion blows of certain intensity while the former will take the shock of an over-solid blow or load and prevent destruction of the rubber.

A still further object of the invention is to provide a removable and renewable shim device of this type in which the rubber element or elements will be of such construction or formation as to permit the flattening out or lateral expansion of the rubber under strain without causing permanent distortion.

Another object is to provide a device of this character having means for effecting centering or positioning thereof with respect to the spring nest.

An additional object is to provide a device of this character which may be modified for use in connection with spring nests of different sizes, depending upon the type of car and load capacity thereof and which will moreover be simple and inexpensive to make, easy to install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a vertical sectional view taken across the side frame at one side of a car truck and showing the truck bolster in elevation with my device interposed between it and the spring nest, Figure 2 is a plan view of the device alone with one of the metal plates thereof broken away, Figure 3 is a vertical cross sectional view therethrough taken on the line 3—3 of Figure 2, Figure 4 is a plan view of the device showing a slight modification for use in connection with cars of greater capacity, a portion of one metal plate being broken away, Figure 5 is a detail sectional view taken on the line 5—5 of Figure 2, Figure 6 is a fragmentary elevation showing a slight modification, Figure 7 is a detail cross section illustrating another variation, Figure 8 is a similar view illustrating yet another form, Figure 9 is a plan view similar to Figure 2 showing another modification, and Figure 10 is a view similar to Figure 1 but showing the shim device located in a different position.

Referring more particularly to the drawings it will be noted that I have shown a portion of a standard A. R. A. truck including a side frame 1 having a window opening 2 through which extends one end of the truck bolster 3 which is ordinarily engaged upon the spring cap 4 at the top of a nest of coil springs 5 which in turn rest upon the spring plank 6 which extends across the truck, there being another spring cap 7 interposed between the spring nest and the spring plank.

In accordance with my invention I interpose between the truck springs 5 and the bolster 3 a shock absorbing or cushioning shim indicated as a whole by the numeral 8. In its broadest sense, this device comprises, preferably, a rubber or equivalent cushion with stop means for limiting the compression thereof. The invention is of course capable of being carried out in various different specific ways and I have consequently illustrated several modifications, certain of which vary from others only in the matter of size and shape to correspond to the size of the spring nest or number of springs therein, this in turn depending upon the capacity of the car, it being known that there are usually four springs provided for a fifty ton truck whereas there are five for one of the seventy ton type. These details are mentioned only for purposes of illustration and the sake of clearness.

As shown in Figures 1 to 3, the shim device 8 preferably comprises a pair of metal plates 9 between which are arranged symmetrically disposed pads 10 of yieldable material, preferably rubber. The metal plates 9 are intended to conform substantially to the size and shape of the spring cap 4 and the rubber pads are not only spaced apart as shown, to permit lateral expansion in all directions, but are also preferably spaced inwardly from the edges of the plates. The principal purpose of the metal plates is to prevent distortion and shaping of the rubber pads and loss of the stop means to be described and they need not, therefore, be of any great thickness. Actually these plates may very conveniently be stamped from sheet steel of, say, one-fourth inch or three-eighths inch in thickness. The rubber pads are naturally several times thicker, the exact dimensions up to certain limits being more or less immaterial.

The metal plates may be formed with circular openings 11 adapted to receive the upstanding projections 12 customarily provided on the spring cap 4 and as these holes are provided in both plates then the shim device is reversible. However, if such should be found desirable for any reason, one plate may have such a hole 11 therein while the other plate, indicated at 13 in Figure 6, may have projections 14 thereon adapted to enter the openings 15 customarily provided in the underside of the truck bolster for the reception of the projections on the spring cap 4. As a rule, the projections on the spring cap extend outwardly about three-eighths of an inch and are conical in shape. If the metal plates 9 have a thickness of three-eighths of an inch, as may be preferable, then it would not be necessary to form holes entirely therethrough as recesses, which might be made by means of a drill, would be entirely sufficient as clearly illustrated in Figure 5. The advantage of this thickness of metal plate 9 and a simple recess therein instead of a hole is that the projection on the spring cap could not actually contact with the rubber pad at this location. However, these different possible constructions are all mere matters of detail which may be easily varied.

As it is desirable that the degree of compression of the rubber pads be limited, I provide stop means for the purpose and it is conceivable that this means might be any one of different detailed forms. In Figures 2 and 3 each rubber pad is represented as having a central opening 16 within which is located a pin or block 17 of metal of a height less than the thickness of the pads and of less diameter than the opening 16 so as to permit the rubber to flow laterally under compression. The exact height of the pins or blocks 17 depends upon the maximum safe compressibility of the rubber.

In Figure 7 there is illustrated a modification in which the metal plates 18, corresponding to the above described plates 9, are formed with inwardly extending projections 19 which may be readily formed by stamping and which are located opposite to and extend within the openings 16 in the rubber pads 10. Located within the opening in each rubber pad is a metal block-like member 20 of less height than the distance between the inwardly extending projections 19 so as to permit compression of the rubber pad while preventing over-compression thereof, the block member 20 being engaged by the confronting faces of the projections 19 to effect the limited movement.

Figure 8 discloses yet another variation in which the metal plates 21 corresponding to the plates 9 and 18 are formed with holes 22 opposite the center of each rubber pad 10, these holes receiving the shanks 23 of stop pins 24 located within the central opening 16 in each pad. The members 24 are preferably frusto-conical in shape to permit flowing or crowding out of the rubber and the outer ends of the reduced shanks 23 are upset to make a permanent mounting. The members 24 are spaced apart a distance corresponding to the safe maximum compression travel of the rubber pads and when the pads have been compressed to the maximum safe extent the members 24 will engage and prevent further compression.

Naturally the size of the metal plates and the number of rubber pads depends upon the character of the spring nest and spring cap in the truck in which the shim device is used and this in turn is governed by the capacity of the car. Figures 2 and 3 show the arrangement for cars ranging, say, from a capacity of forty to fifty-five ton trucks whereas Figure 4 shows larger metal plates 25 and a greater number of rubber pads such as would be necessary say for a seventy ton car. In every other respect the construction may be the same, that is to say either the stop pins 17 shown in Figure 2 or the stop members 20 and 24 shown in Figures 7 and 8, respectively, may be employed, as the only difference is in the matter of size and number of pads.

In the above described forms of the invention the rubber pads 10 are represented as of rectangular shape spaced apart a sufficient distance to permit the rubber to flow or crowd when compressed. However, there is no necessity for this particular shape and in fact it may be preferable to use pads of circular or cylindrical shape as shown at 25 in Figure 9, the corners of the confining metal plates 26 being preferably rounded off and substantially concentric with the corner pads. It is also intended that the pads be spaced inwardly from the edges of the metallic plates as in the first described forms and that they also be spaced apart to permit the lateral crowding out or flowing of the rubber under compression. An advantage in employing the circular or cylindrical pads with the metallic stop elements, of any type desired, at the centers thereof is that there will be a uniform distance between the stop element and the outer edge of each pad at all points so that the lateral crowding out or flow of material will be uniform.

In assembling the shim device, it is conceivable that the rubber pads might be vulcanized onto one or both of the metal plates though actually it is probably sufficient that they simply be shellacked or cemented in place for the purpose of preventing dislocation of the parts and consequent loss of the stop members in case those shown in Figures 3 and 7 are used, when the device is handled during transportation or at any time prior to its installation within a truck. The device is installed simply by interposing it between the spring cap 4 and the underside of the truck bolster as shown in Figure 1 or between the bottom cap and the spring plank as shown in Figure 10. The pressure will then hold the parts against displacement so that no further reliance need be placed upon the shellac, cement or what other securing means might be provided. The holes or recesses 11 in the lower plate member 9 will receive the upstanding projections 12 on the spring cap 4. If the top plate be provided with corresponding projections, as shown at 14 in Figure 6, then they will in turn be received within the openings 15 in the underside of the truck bolster.

In all forms of the invention, it is apparent that the operation will be the same, that is to say the rubber pads will be compressed, the degree of compression being limited either by the engagement of the top plate 9 with the stop pins 17 shown in Figures 2 and 3, by the engagement of the depressions 19 in the top plate with the blocks 20 as shown in Figure 7, or by engagement of the stop pins 24 shown in Figure 8. The shim device is of course in series with the truck springs regardless of whether it be placed above or below the nest. When compression of the rubber pads occurs the rubber is permitted to flow or crowd laterally owing to the spacing apart of the pads and the greater diameter of the holes therein as compared with the diameter of the stop pins, blocks or other elements. The metallic stop members, regardless of which form is employed, will operate to prevent over-compression of and damage to the rubber. When a shim device of this type is installed within a truck it is evident that it will absorb over-solid blows and relieve the mechanism of excessive strains which would otherwise come upon it. Another point of advantage is that the yieldable rubber pads will operate to smooth out small shocks and jars such as would not affect the springs to any material extent and will consequently improve the riding qualities of the car. Furthermore as the rubber pads naturally have a different period of vibration from that of the helical springs which compose the spring nest it is evident that synchronism will be broken up and vertical jiggle greatly reduced if not actually entirely eliminated. It will be noted that the construction is not only simple but extremely rugged and that in the event of any necessity for replacements the shim devices may be removed from the truck and equipped with new or fresh rubber pads. However, this would not be necessary until after the expiration of a prolonged period. It is believed from the foregoing that the construction, operation and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck embodying a bolster and supporting springs therefor, a laterally unconfined yieldable cushion interposed between the springs and the bolster in contact with the latter and acting in series with the springs.

2. In a railway car truck embodying a bolster and supporting springs therefor, a yieldable cushion interposed between the springs and the spring plank and acting in series with the springs, and means for limiting the compression of the cushion while permitting lateral expansion in all directions.

3. In a railway car truck embodying a bolster and supporting springs therefor arranged in a nest, means disposed against a selected side of the nest and operating in series therewith for absorbing shocks, said means embodying a laterally expansible rubber pad.

4. In a railway car truck embodying a bolster and supporting springs therefor arranged in a nest having end caps, means disposed against a selected cap and operating in series with the springs for absorbing shocks, said means embodying a rubber pad mounted between metallic plates, and unconfined laterally.

5. In a railway car truck embodying a bolster and supporting springs therefor, means interposed between the bolster and the springs for absorbing shocks, said means embodying a rubber pad confined between metallic plates and enclosing stop means for limiting its compression.

6. An absorption device for railway car trucks comprising a shim structure adapted for interposition between the bolster and the supporting springs therefor and comprising metallic plates, a yieldable pad interposed therebetween, and means for limiting the compression of the pad.

7. An absorption device for railway car trucks comprising a shim structure adapted for interposition between the bolster and the supporting springs therefor and comprising metallic plates, a yieldable pad interposed therebetween, and means for limiting the compression of the pad, said limiting means consisting of metallic elements interposed in the pad and of less height than the thickness of the pad.

8. An absorption shim device for insertion between a truck bolster and the supporting springs therefor, comprising metallic plates, a rubber pad interposed therebetween, stop means for limiting the compression of the pad, the pad having openings permitting the material thereof to flow or crowd in all lateral directions.

9. An absorption device of the character described adapted for interposition between a truck bolster and the supporting springs therefor, comprising metallic plate members, a yieldable rubber pad interposed therebetween and formed with openings, and metallic stop elements located within said openings.

10. An absorption device of the character described adapted for interposition between a truck bolster and the supporting springs therefor, comprising metallic plate members, a plurality of yieldable rubber pads interposed therebetween and formed with openings, and metallic stop elements located within said openings and of less diameter than the openings to permit crowding of the material of the pad in all lateral directions.

11. An absorption device of the character described adapted for interposition between a truck bolster and the supporting springs therefor, comprising metallic plate members, a yieldable cushion interposed therebetween and comprising pad units formed with openings, and metallic stop elements located within said openings and of less diameter than the openings to permit crowding of the material of the pad in all lateral directions, said metal plates being apertured for the accommodation of the centering projections on the spring cap of the truck.

12. In a railway car truck, the combination with the truck springs, of a cushioning device interposed in series therewith and comprising a plurality of rubber pads confined between metallic plate elements and containing compression limiting means.

13. In a railway car truck, the combination with the truck springs, of a cushion interposed in series therewith and comprising metallic confining plates, a plurality of rubber pads located therebetween and formed centrally with openings, and metallic stop elements located within the openings, said pads being of cylindrical form whereby they are capable of uniform lateral expansion in all directions under compression.

14. An absorption shim adapted for interposition in series with a nest of railway truck springs, comprising a pair of metal plates, a rubber pad interposed between said plates, said pad being formed with an opening therethrough, and a metallic pin located within the opening and of less height than the thickness of the pad for limiting compression thereof.

15. An absorption shim device adapted for interposition in series with a railway truck spring nest comprising a pair of metal plates with a plurality of rubber pads interposed therebetween, each pad being formed with an opening, and attached metallic elements projecting inwardly from the confronting faces of said plates and entering the openings in the respective pads, said metallic elements being spaced apart but adapted to contact for limiting compression of the pads.

16. An absorption shim device adapted for interposition in series with a railway truck spring nest comprising a pair of metal plates with a plurality of rubber pads interposed therebetween, each pad being formed with an opening, spaced metallic elements projecting inwardly from the confronting faces of said plates and entering the openings in the respective pads, and means interposed between said elements and cooperating therewith for limiting compression of the pads, said metallic elements being struck out from the material of the plates.

17. An absorption shim device adapted for interposition in series with a railway truck spring nest comprising a pair of metal plates with a plurality of rubber pads interposed therebetween, each pad being formed with an opening, and metallic elements projecting inwardly from the confronting faces of said plates and entering the openings in the respective pads, said metallic elements being spaced apart but adapted to contact for limiting compression of the pads, said metallic elements being formed as rivet-like members having shanks passing through the plates and having tapered heads.

In testimony whereof I affix my signature.

THOMAS H. SYMINGTON.